US012282587B2

(12) United States Patent
Huh et al.

(10) Patent No.: US 12,282,587 B2
(45) Date of Patent: Apr. 22, 2025

(54) ELECTRONIC DEVICE AND CONTROL METHOD THEREOF

(71) Applicant: SAMSUNG ELECTRONICS CO., LTD., Suwon-si (KR)

(72) Inventors: Jun Ho Huh, Suwon-si (KR); Donguk Kim, Suwon-si (KR); Choonghoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 204 days.

(21) Appl. No.: 17/894,586

(22) Filed: Aug. 24, 2022

(65) Prior Publication Data

US 2022/0405430 A1 Dec. 22, 2022

Related U.S. Application Data

(63) Continuation of application No. PCT/KR2021/000465, filed on Jan. 13, 2021.

(30) Foreign Application Priority Data

Feb. 24, 2020 (KR) ........................ 10-2020-0022062

(51) Int. Cl.
*G06F 21/74* (2013.01)
*G06F 18/25* (2023.01)
(Continued)

(52) U.S. Cl.
CPC ............ *G06F 21/74* (2013.01); *G06F 18/251* (2023.01); *G06F 21/62* (2013.01); *G06N 3/063* (2013.01)

(58) Field of Classification Search
CPC .......... G06F 17/15; G06F 21/52; G06F 21/53; G06N 3/10; G06N 3/045; G06N 3/063;
(Continued)

(56) References Cited

U.S. PATENT DOCUMENTS 10,002,402 B2 6/2018 Liu et al.
11,244,222 B2 2/2022 Kuo
(Continued)

FOREIGN PATENT DOCUMENTS

CN 110148935 A 8/2019
CN 109918951 B 9/2020
(Continued)

OTHER PUBLICATIONS

Gu et al., "Securing Input Data of Deep Learning Inference Systems via Partitioned Enclave Execution", ArXiv, Jul. 3, 2018, 14 total pages, arXiv:1807.00969v1.
(Continued)

*Primary Examiner* — Dustin Nguyen
(74) *Attorney, Agent, or Firm* — Sughrue Mion, PLLC

(57) ABSTRACT

An electronic device includes a memory and a processor. The memory stores information related to an artificial intelligence model that performs arithmetic operations through neural network layers. The processor pre-processes raw data and obtains output data by inputting the pre-processed raw data to the artificial intelligence model. First data used for pre-processing the raw data and second data used in a portion of the neural network layers are stored in a secure area of the memory, and third data used in remaining layers of the neural network layers other than the portion is stored in a non-secure area of the memory.

7 Claims, 7 Drawing Sheets

(51) Int. Cl.
*G06F 21/62* (2013.01)
*G06N 3/063* (2023.01)

(58) Field of Classification Search
CPC .... G06N 5/21; G06T 3/4046; G05B 13/0285; G05B 23/024; B25J 9/1671; G06V 20/40
See application file for complete search history.

(56) References Cited

U.S. PATENT DOCUMENTS

| | | |
|---|---|---|
| 2017/0289409 A1* | 10/2017 | Min ........................ H04N 5/21 |
| 2018/0144465 A1 | 5/2018 | Hsieh et al. |
| 2018/0158177 A1 | 6/2018 | Lannes et al. |
| 2018/0299841 A1* | 10/2018 | Appu ................. G05B 13/0285 |
| 2018/0300556 A1* | 10/2018 | Varerkar ................ G06V 20/40 |
| 2019/0042878 A1 | 2/2019 | Sheller et al. |
| 2019/0042937 A1 | 2/2019 | Sheller et al. |
| 2019/0045207 A1* | 2/2019 | Chen ...................... G06N 3/045 |
| 2019/0087689 A1 | 3/2019 | Chen |
| 2019/0108618 A1* | 4/2019 | Hwang ................. G06T 3/4046 |
| 2019/0130250 A1 | 5/2019 | Park et al. |
| 2019/0197396 A1* | 6/2019 | Rajkumar .............. B25J 9/1671 |
| 2019/0392194 A1* | 12/2019 | Croxford ................ G06F 17/15 |
| 2019/0392305 A1* | 12/2019 | Gu .......................... G06F 21/53 |
| 2020/0379454 A1* | 12/2020 | Trinh .................... G05B 23/024 |
| 2021/0133361 A1* | 5/2021 | Fishel .................... G06N 3/063 |
| 2021/0232933 A1* | 7/2021 | Gu ............................ G06N 3/10 |
| 2022/0114014 A1* | 4/2022 | Chen ...................... G06F 21/52 |

FOREIGN PATENT DOCUMENTS

| | | |
|---|---|---|
| JP | 2018-85135 A | 5/2018 |
| JP | 6954084 B2 | 10/2021 |
| JP | 7026298 B2 | 2/2022 |
| KR | 10-1972231 B1 | 4/2019 |
| KR | 10-2020-0000361 A | 1/2020 |
| WO | 2018/008605 A1 | 1/2018 |

OTHER PUBLICATIONS

Communication dated Jun. 29, 2023, issued by European Patent Office for European Patent Application No. 21760057.6.
Communication dated Apr. 22, 2021, issued by the International Searching Authority in counterpart International Application No. PCT/KR2021/000465 (PCT/ISA/210 and PCT/ISA/237).
Communication dated Feb. 3, 2025, issued by European Patent Office in European Patent Application No. 21760057.6.

* cited by examiner

ELECTRONIC DEVICE AND CONTROL METHOD THEREOF

CROSS-REFERENCE TO RELATED APPLICATION

This application is a continuation application of International Application No. PCT/KR2021/000465, filed on Jan. 13, 2021, which is based on and claims priority from Korean Patent Application No. 10-2020-0022062, filed on Feb. 24, 2020, in the Korean Intellectual Property Office, the disclosures of each of which being incorporated by reference herein in their entireties.

BACKGROUND

1. Field

The disclosure relates to an electronic device and a control method thereof, and more particularly, to an electronic device that stores an artificial intelligence model and obtains output data through the stored artificial intelligence model, and a control method thereof.

2. Description of Related Art

Recently, an artificial intelligence model is operated on a device (i.e., on-device) rather than on a server in consideration of server cost, quick response, and privacy issues. In this case, a problem in which competitors and the like use the stored on-device artificial intelligence model without permission may occur.

SUMMARY

It is an aspect to provide an electronic device that prevents leakage of an artificial intelligence model, and a control method thereof.

In accordance with an aspect of the disclosure, an electronic device may comprise a memory configured to store information related to an artificial intelligence model that performs arithmetic operations through a plurality of neural network layers; and a processor configured to pre-process raw data and obtain output data by inputting the pre-processed raw data to the artificial intelligence model, wherein first data used for pre-processing the raw data and second data used in a portion of the plurality of neural network layers are stored in a secure area of the memory, and third data used in remaining layers of the plurality of neural network layers other than the portion of the plurality of neural network layers is stored in a non-secure area of the memory.

In accordance with another aspect of the disclosure, a control method of an electronic device may comprise pre-processing raw data based on first data stored in a secure area of a memory included in the electronic device; and obtaining output data by applying the pre-processed raw data to an artificial intelligence model based on second data used in a portion of a plurality of neural network layers of the artificial intelligence model and stored in the secure area, and third data used in remaining layers of the plurality of neural network layers other than the portion of the plurality of neural network layers and stored in a non-secure area of the memory.

In accordance with yet another aspect of the disclosure, an electronic device may comprise a processor configured to pre-process raw data, input the pre-processed raw data to an artificial intelligence model that includes a plurality of neural network layers, and output, from the artificial intelligence model, output data; and a memory comprising a secure area that stores a portion of data that is necessary for operation of the artificial intelligence model, and a non-secure area that stores remaining data that is used for the operation of the artificial intelligence model other than the portion.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
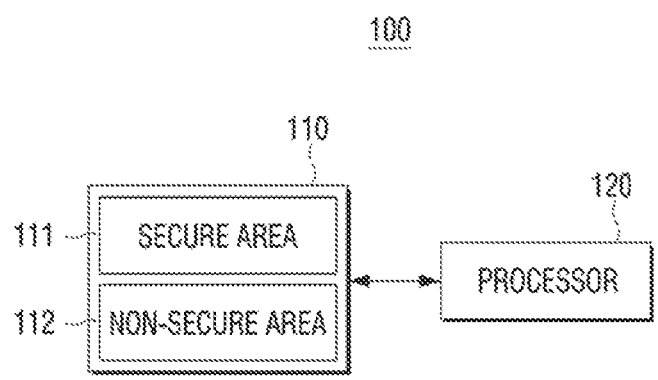
FIG. 1 is a block diagram illustrating a configuration of an electronic device according to an embodiment.

As used herein, the terms "1 st" or "first" and "2nd" or "second" may use corresponding components regardless of importance or order and are used to distinguish one component from another without limiting the components.

As described above, an artificial intelligence model may be operated on a device (i.e., on-device) rather than on a server in consideration of server cost, quick response, and privacy issues. In this case, a problem in which competitors and the like use the stored on-device artificial intelligence model without permission may occur.

The artificial intelligence model may be encrypted to prevent such a problem, but a security issue of an encryption key may be another problem.

Even in case that the artificial intelligence model is encrypted, the encrypted artificial intelligence model may be restored and loaded into a memory at the time of execution, and the artificial intelligence model may be leaked even in this case.

The artificial intelligence model may be executed in a trust zone. However, in general, the artificial intelligence model occupies a significant capacity, and only a relatively small capacity is allocated to the trust zone, which is problematic.

Therefore, there is a need to develop a technology for preventing leakage of artificial intelligence models.

It is an aspect to provide an electronic device that prevents leakage of an artificial intelligence model, and a control method thereof.

In accordance with an aspect of the disclosure, an electronic device may include a memory configured to store information related to an artificial intelligence model that performs an arithmetic operation through a plurality of neural network layers; and a processor configured to pre-process raw data and obtain output data by inputting the pre-processed data to the artificial intelligence model, in which first data used for the pre-processing of the raw data and second data used in some of the plurality of neural network layers may be stored in a secure area of the memory, and third data used in remaining layers of the plurality of neural network layers may be stored in a non-secure area of the memory.

In accordance with another aspect of the disclosure, a control method of an electronic device may include pre-processing raw data based on first data stored in a secure area of a memory included in the electronic device; and obtaining output data obtained by applying the pre-processed raw data to an artificial intelligence model based on second data used in some of a plurality of neural network layers of the artificial intelligence model and stored in the secure area, and third data used in remaining layers of the plurality of neural network layers and stored in a non-secure area of the memory.

In accordance with yet another aspect of the disclosure, a non-transitory computer-readable recording medium stores a program for executing a control method of an electronic device, where the control method may include pre-processing raw data based on first data stored in a secure area of a memory included in the electronic device; and obtaining output data obtained by applying the pre-processed raw data to an artificial intelligence model based on second data used in some of a plurality of neural network layers of the artificial intelligence model and stored in the secure area, and third data used in remaining layers of the plurality of neural network layers and stored in a non-secure area of the memory.

According to various embodiments, an electronic device may prevent the artificial intelligence model from being leaked by storing some data for the operation of the artificial intelligence model in the secure area.

Hereinafter, various embodiments will be described in detail with reference to the accompanying drawings.

FIG. 1 is a block diagram illustrating a configuration of an electronic device according to an embodiment.

Referring to FIG. 1, an electronic device 100 may include a memory 110 and a processor 120.

In some embodiments, the electronic device 100 may be a device that stores an artificial intelligence model and obtains output data through the stored artificial intelligence model. For example, the electronic device 100 may be implemented by various devices such as a user terminal device, a display device, a set-top box, a tablet personal computer (PC), a smartphone, an e-book reader, a desktop PC, a laptop PC, a workstation, a server, a personal digital assistant (PDA), a portable multimedia player (PMP), and/or an MP3 player. However, these are merely examples, and in some embodiments, the electronic device 100 may be a device such as a navigation device, a vehicle infotainment device, various medical devices, or an Internet of things device, and in other embodiments may be any device that stores an artificial intelligence model and obtains output data through the stored artificial intelligence model.

The memory 110 may store various programs and data necessary for an operation of the electronic device 100. For example, the memory 110 may store an operating system (OS) and an application program executed on the operating system.

The memory 110 may be implemented by a non-volatile memory, a volatile memory, a flash-memory, a hard disk drive (HDD), a solid state drive (SSD), ad/or a memory card (not illustrated) mounted on the electronic device 100 (for example, a micro SD card or memory stick), and an operating system and an application program may be stored in the memory 110 according to a control by a manufacturer or a user of the electronic device 100.

In some embodiments, the operating system may mean an operating system that is used to execute the application program, and the application program executed on the operating system may mean an executable program supported by the operating system.

The memory 110 may include a secure area 111 and a non-secure area 112. The secure area 111 may be an area accessible only based on an authority, and the non-secure area 112 may be an area accessible regardless of an authority.

In some embodiments, the secure area 111 and the non-secure area 112 may be implemented in software. For example, the processor 120 may access the secure area 111 and the non-secure area 112 while a secure operating system is running, and may access the non-secure area 112 while another operating system is running. That is, in some embodiments, the processor 120 may only access the non-secure area 112 while the another operating system is running and may not access the secure area 111 while the another operating system is running. For example, the another operating system may be an operating system other than the secure operating system. In some embodiments, the another operating system may be a non-secure operating system.

In some embodiments, the secure area 111 and the non-secure area 112 may be separately implemented in hardware. For example, the memory 110 may include a first memory 111 used as the secure area and a second memory 112 used as the non-secure area. In some embodiments, for the first memory 111, a storage mechanism protected by a device such as a trust zone or a trusted platform module (TPM) may be used.

In this case, only a device connected to the first memory 111 in hardware may access the first memory 111. The device connected to the first memory 111 in hardware may be a first device included in the processor 120 or a second device separate from the processor 120.

The memory 110 may store information related to an artificial intelligence model that performs an arithmetic operation through a plurality of neural network layers. In particular, the memory 110 may prevent leakage of the artificial intelligence model by storing information related to the artificial intelligence model in the secure area 111 and the non-secure area 112 in a divided manner.

For example, first data used for pre-processing of raw data and second data used in some of the plurality of neural network layers may be stored in the secure area 111 of the memory 110, and third data used in the remaining layers of the plurality of neural network layers may be stored in the non-secure area 112 of the memory 110. In some embodiments, the raw data may be input to the artificial intelligence model after pre-processing.

The processor 120 controls an overall operation of the electronic device 100. Specifically, the processor 120 may be connected to each component of the electronic device 100 to control the overall operation of the electronic device 100.

For example, the processor 120 may be connected to the memory 110 and control the operation of the electronic device 100.

According to an embodiment, the processor 120 may be implemented by a digital signal processor (DSP), a microprocessor, and/or a time controller (TCON). However, embodiments are not limited thereto and the processor 120 may include one or more of a central processing unit (CPU), a micro controller unit (MCU), a micro processing unit (MPU), a controller, an application processor (AP), a communication processor (CP), and/or an ARM processor, or may be defined by these terms. In some embodiments, the processor 120 may be implemented by a system-on-chip (SoC) or large scale integration (LSI) in which a processing algorithm is embedded, or may be implemented by a field programmable gate array (FPGA).

In some embodiments, the processor 120 may be implemented to have an architecture having a "trust zone" type security structure. In this case, according to a trust zone technology, one processor 120 may be managed by being divided into two virtual spaces, a normal world and a secure world. The secure world may be a system environment driven by the secure operating system, and the normal world may be a system environment driven by another operating system or than the secure operating system. For example, in some embodiments, the another operating system may be a non-secure operating system. That is, the access to the secure area 111 is not possible in case that the processor 120 operates as the normal world, and the access to the secure area 111 is possible in case that the processor 120 operates as the secure world. A detailed description thereof will be described later with reference to the drawings.

The processor 120 may pre-process the raw data and input the pre-processed data to the artificial intelligence model to obtain the output data. For example, in case that the first data used for the pre-processing of the raw data and the second data used in some of the plurality of neural network layers are stored in the secure area 111, and the third data used in the remaining layers of the plurality of neural network layers is stored in the non-secure area 112, the processor 120 may obtain the output data by using the first to third data stored in the secure area 111 and the non-secure area 112. In some embodiments, the first data may include at least one of data used for filtering of raw data to be input to the artificial intelligence model among a plurality of raw data, or data used for conversion of raw data into input data to be input to the artificial intelligence model.

As a more specific example, the second data may include information regarding parameters used in the last layer of the plurality of neural network layers, and the third data may include information regarding parameters used in layers except for the last layer of the plurality of neural network layers. In some embodiments, the parameter may be an element (weight) included in each of the plurality of neural network layers.

The processor 120 may operate as the secure world, read the raw data stored in the non-secure area 112, and pre-process the raw data based on the first data.

In some embodiments, the processor 120 may operate as the normal world, perform an arithmetic operation on the pre-processed data based on the third data, and obtain feature map information output from a previous layer of the last layer.

The processor 120 may operate as the secure world, perform an arithmetic operation on the feature map information based on the second data, and obtain, as the output data, data output from the last layer.

That is, some of data for driving the artificial intelligence model may be stored in the secure area 111 of the memory 110, and the processor 120 may operate as the secure world to access the secure area 111 and perform an arithmetic operation related to the artificial intelligence model. Accordingly, the security of the data stored in the secure area 111 may be enhanced.

Although it has been described above that the second data includes the information regarding the parameters used in the last layer of the plurality of neural network layers for convenience of explanation, embodiments are not limited thereto. For example, in some embodiments, the second data may include a parameter used in at least one layer determined based on the size of parameter information used in each of the plurality of neural network layers. In some embodiments, the second data may include only information regarding some of the parameters used in the last layer of the plurality of neural network layers.

Further, it has been described above that one processor 120 operates as the normal world or the secure world for convenience of explanation, but embodiments are not limited thereto. For example, in some embodiments, the processor 120 may include a first processor operating as the normal world and a second processor operating as the secure world. In some embodiments, the first processor and the second processor may be configured as separate hardware components.

In some embodiments, the electronic device 100 may further include a sensor, and in case that at least one raw data is obtained through the sensor, the processor 120 may filter the obtained raw data based on the first data and convert the filtered raw data into the input data to be input to the artificial intelligent model.

For example, in some embodiments, the electronic device 100 may include a luminance sensor, and the processor 120 may obtain a plurality of luminance values at preset time intervals through the luminance sensor. In some embodiments, the plurality of luminance values are the raw data.

In some embodiments, the processor 120 may filter only a value equal to or greater than a threshold luminance value among the plurality of luminance values based on the first data. The processor 120 may quantize the filtered luminance value and input the quantized value to the artificial intelligence model.

In the above description, the luminance sensor is exemplified for convenience of explanation, but embodiments are not limited thereto. For example, in some embodiments, the processor 120 may also obtain the raw data from an infrared sensor, a touch sensor, a gravity sensor, an acceleration sensor, a gyro sensor, and the like. In some embodiments, the processor 120 may use, as the raw data, data obtained from a communication interface, a microphone, a camera, and the like rather than the sensor.

The communication interface is a component that performs communication with various types of external devices according to various types of communication methods. The communication interface includes a Wi-Fi module, a Bluetooth module, an infrared communication module, a wireless communication module, and the like. In some embodiments, each communication module may be implemented in a form of at least one hardware chip.

The processor 120 may perform communication with various external devices by using the communication interface. In some embodiments, the external device may include an external server, a Bluetooth earphone, and the like.

The Wi-Fi module and the Bluetooth module perform communication in a Wi-Fi manner and a Bluetooth manner, respectively. In case of using the Wi-Fi module or Bluetooth module, various connection information such as a service set identifier (SSID) and a session key is first transmitted and received, communication is connected using the connection information, and various information may then be transmitted and received.

The infrared communication module performs communication according to an infrared data association (IrDA) technology using infrared light which lies between visible light and millimeter waves for short-distance wireless data transmission.

The wireless communication module may include at least one communication chip performing communication according to various wireless communication protocols such as Zigbee, $3^{rd}$ generation (3G), $3^{rd}$ generation partnership project (3GPP), long term evolution (LTE), LTE Advanced (LTE-A), 4th generation (4G), and 5th generation (5G), in addition to the communication manner described above.

In some embodiments, the communication interface may include at least one wired communication module performing communication by using a local area network (LAN) module, an Ethernet module, a pair cable, a coaxial cable, an optical fiber cable, or the like.

The communication interface may further include an input/output interface. The input/output interface may be one or more of high definition multimedia interface (HDMI), mobile high-definition link (MHL), universal serial bus (USB), DisplayPort (DP), a thunderbolt, a video graphics array (VGA) port, an RGB port, a D-subminiature (D-SUB), and/or a digital visual interface (DVI).

The input/output interface may input and output at least one of an audio signal or a video signal.

In some implementation examples, the input/output interface may include, as separate ports, a port for inputting and outputting only an audio signal and a port for inputting and outputting only a video signal, or may be implemented as one port for inputting and outputting both an audio signal and a video signal.

The microphone is a component for receiving a user's voice or other sounds and converting the user's voice or other sounds into audio data. The microphone may receive a user's voice in an activated mode. For example, the microphone may be formed integrally with the electronic device 100 at an upper side, a front surface, a side surface, or the like, of the electronic device 100. The microphone may include various components such as a microphone collecting a user's voice in an analog form, an amplifier circuit amplifying the collected user's voice, an A/D conversion circuit sampling the amplified user's voice and converting the user's voice into a digital signal, and a filter circuit removing a noise component from the digital signal obtained by the conversion.

The camera is a component for capturing a still image or a moving image. The camera may capture a still image at a specific point in time, and may also continuously capture still images.

In some embodiments, the electronic device 100 may further include a component for providing the output data to a user. For example, the electronic device 100 may further include at least one of a display or a speaker, and may display the output data or provide the output data as sound to a user.

In some embodiments, the display may be implemented by various types of displays such as a liquid crystal display (LCD), an organic light emitting diode (OLED) display, and/or a plasma display panel (PDP). A driving circuit, a backlight unit, and the like, that may be implemented in a form such as a-si thin film transistor (TFT), a low temperature poly silicon (LTPS) TFT, and/or an organic TFT (OTFT) may be included in the display. In some embodiments, the display may be implemented by a touch screen combined with a touch sensor, a flexible display, a three-dimensional (3D) display, or the like.

The speaker may be a component that outputs various types of audio data processed in the input/output interface, as well as various notification sounds or voice messages.

In some embodiments, functions related to artificial intelligence according to the disclosure may be executed through the processor 120 and the memory 110.

The processor 120 may be implemented by one or more processors. In some embodiments, the one or more processors may be a processor such as a CPU, an AP, or a digital signal processor (DSP), a graphic dedicated processor such as a GPU and/or a vision processing unit (VPU), and/or an artificial intelligence dedicated processor such as a neural processing unit (NPU).

The one or more processors perform control to process the input data according to a pre-defined operation rule stored in the memory or an artificial intelligence model. In some embodiments, in case that the one or more processors are artificial intelligence dedicated processors, the artificial intelligence dedicated processor may be designed to have a hardware structure specialized in processing of a specific artificial intelligence model. The pre-defined operation rule or the artificial intelligence model is obtained through learning.

In some embodiments, obtaining the pre-defined operation rule or the artificial intelligence model through learning means that a basic artificial intelligence model is trained using multiple learning data by a learning algorithm to obtain the pre-defined operation rule or the artificial intelligence model set to achieve a desired characteristic (or purpose). Such learning may be performed by a device in which artificial intelligence is performed according to the disclosure, or may be performed through a separate server and/or system. Examples of the learning algorithm include supervised learning, unsupervised learning, semi-supervised learning, and reinforcement learning, but are not limited thereto.

The artificial intelligence model may include the plurality of neural network layers. Each of the plurality of neural network layers has a plurality of weight values, and a neural network arithmetic operation is performed through an arithmetic operation for arithmetic operation results of previous layers and the plurality of weight values. The plurality of weight values of the plurality of neural network layers may be optimized by a learning result of the artificial intelligence model. For example, the plurality of weight values may be updated to decrease or minimize a loss value or cost value obtained by the artificial intelligence model during the learning process.

An artificial neural network may include a deep neural network (DNN). For example, the artificial neural network may be a convolutional neural network (CNN), a deep neural network (DNN), a recurrent neural network (RNN), a restricted Boltzmann machine (RBM), a deep belief network (DBN), a bidirectional recurrent deep neural network (BRDNN), and/or a deep Q-network, but embodiments are not limited thereto.

As described above, the electronic device 100 may store some data necessary for the operation of the artificial intelligence model in the secure area 111 to prevent the artificial intelligence model from being leaked due to a memory attack. In particular, in some embodiments, most of the layers included in the artificial intelligence model may be stored in the non-secure area 112, and it is thus also possible to solve an excessive load problem occurring in the secure area. In some embodiments, data for pre-processing the data to be input to the artificial intelligence model may also be stored in the secure area 111, and thus, the security of the pre-processing process may also be maintained.

Hereinafter, the operation of the electronic device 100 will be described in more detail with reference to FIGS. 2 to 5. Individual embodiments will be described with reference to FIGS. 2 to 5 for convenience of explanation. However, the individual embodiments of FIGS. 2 to 5 may be implemented in any combination.

Figure 2:
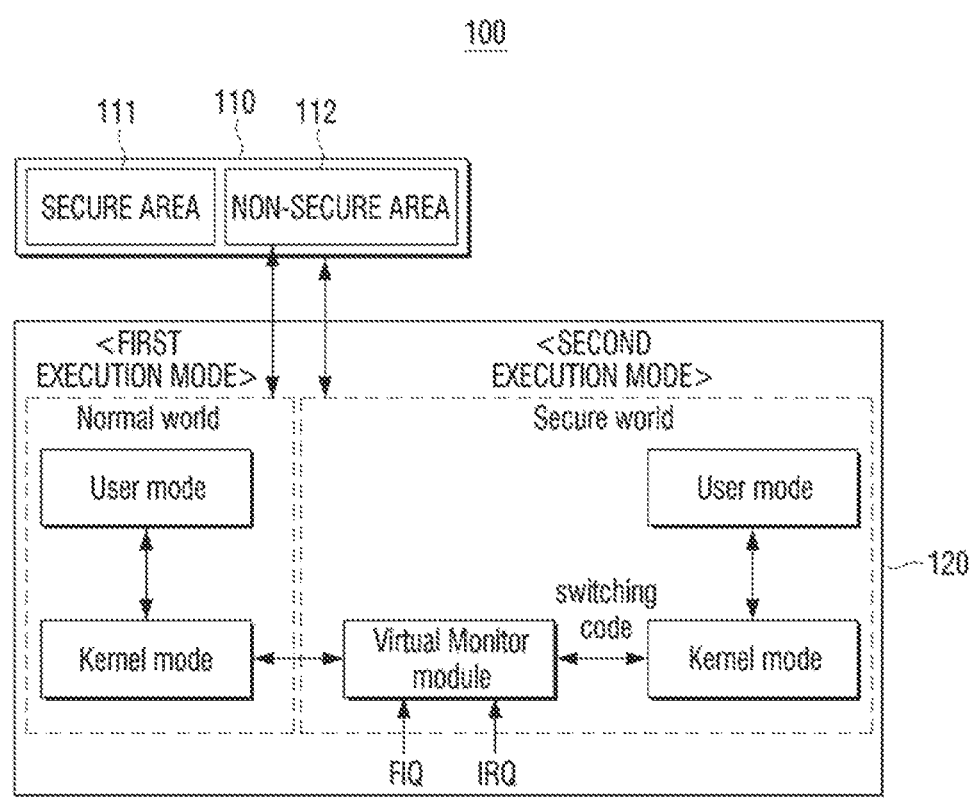
FIG. 2 is a diagram illustrating an execution mode of a processor according to an embodiment.

FIG. 2 is a diagram illustrating an execution mode of the processor 120 according to an embodiment.

According to an embodiment, the processor 120 may selectively operate in one of a first execution mode and a second execution mode. In some embodiments, the first execution mode is an execution mode based on the another operating system other than the secure operating system, and the second execution mode is an execution mode based on the secure operating system. The first execution mode and the second execution mode may be expressed as the normal world and the secure world, respectively. The secure world may mean a secure data processing architecture, and the normal world may mean another data processing architecture other than a secure data processing architecture. In some embodiments, the another data processing architecture may be a non-secure data processing architecture.

According to an embodiment, a "trust zone architecture" may be used for the processor 120. The "trust zone architecture" denotes a microprocessor including two divided runtime-architectures. A non-secure runtime-architecture, which is one of the two runtime-architectures, may be referred to as a "normal zone" or the "normal world". The non-secure runtime-architecture may operate based on the another operating system. The other one of the two runtime-architectures is a secure runtime-architecture, and the secure runtime-architecture may be referred to as a "trust zone", a "trusted world", or the "secure world". The secure runtime-architecture may operate based on the secure operating system.

In some embodiments, the another operating system may be, for example, an operating system such as Android, Windows, or Symbian. The secure operating system may be, for example, an operating system in which a security kernel in which a security function is integrated into an existing operating system, such as MOBICORE or RedCastle, is inserted. According to the trust zone, the above-described non-secure runtime-architecture and secure runtime-architecture may be defined as virtual first and second execution modes, respectively.

In the processor 120 according to an embodiment, either the secure operating system or the another operating system may be set as a default. For example, in case that the another operating system is set as a default, the processor 120 may operate in the first execution mode based on the another operating system, and in case that a preset event occurs, the processor 120 may switch to the second execution mode. In this case, the secure operating system may be executed in the second execution mode. In some embodiments, the preset event may be a mode selection command of a user, reception of a switching code, issuance of a mode switching instruction, or the like.

For example, in case that the preset event is reception of a switching code, the processor 120 may switch from the first execution mode to the second execution mode once a switching code for mode switching is received from a kernel of the operating system. In some embodiments, the switching code is generated by the kernel of the operating system rather than a user, it is thus possible to reduce a risk that the switching code is generated by malicious hacking or abnormal access.

In some embodiments, the switching code may be a secure monitor code/call (SMC) instruction executed in the kernel of the operating system. The SMC instruction is transmitted to a virtual monitor module, and the virtual monitor module may perform switching from the first execution mode to the second execution mode. In case that the SMC instruction is received in a state in which the execution mode is the second execution mode, the virtual monitor module may perform switching from the second execution mode to the first execution mode.

The processor 120 may include a secure configuration register (SCR), and information regarding the current execution mode may be stored as an NS-bit in the SCR. For example, the NS-bit may be stored as 1 in the first execution mode, and the NS-bit may be stored as 0 in the second execution mode. In some embodiments, the virtual monitor module may operate in the secure world, and the execution mode may be switched by changing the value of the NS-bit.

In some embodiments, in addition to using the SMC instruction, the processor 120 may use an interrupt request (IRQ) and/or a fast interrupt request (FIQ) to change the current execution mode to a virtual monitor mode. In general, the IRQ may be used as an interrupt in the first execution mode, and the FIQ may be used as an interrupt in the second execution mode.

In some embodiments, in case that a user command for selecting the execution mode is received, the processor 120 may perform switching to an execution mode corresponding to the user command. For example, in case that a user command for switching from the first execution mode based on the another operating system to the second execution mode is received, the processor 120 may perform switching to the second execution mode.

In some embodiments, in case that the another operating system is running in a state in which the processor 120 operates in the first execution mode, the electronic device 100 may be shut down and rebooted to run the secure operating system, and the processor 120 may operate in the second execution mode based on the secure operating system.

In case that the execution mode is switched, the virtual monitor module may store a context of the current execution mode and restore a context of a new execution mode. For example, in case of switching from the normal world to the secure world, an execution environment of the normal world may be stored in a monitor mode. Then, in case of switching back the secure world to the normal world, a program may be executed in the previously stored environment of the normal world.

In some embodiments, the first execution mode and the second execution mode may be understood as executing an operating system corresponding to each execution mode, but in case that data requiring security is generated while running the another operating system and executing an application program operating on the another operating system, the processor 120 may send the data to the second execution mode and the secure operating system.

For example, in case that the processor 120 accesses a specific address of the memory 110 to execute an application program operating on the another operating system, and data corresponding to the address is the second execution mode based on the secure operating system, the processor 120 may send data generated in the first execution mode to the second execution mode and operate in the secure operating system.

In some embodiments, the processor 120 may perform mode switching according to an instruction to perform mode switching after performing each operation. For example, a module executing the artificial intelligence model may include an instruction to perform mode switching after pre-processing is completed and an instruction to perform mode switching after an arithmetic operation for some of the plurality of neural network layers is performed. The processor 120 may perform mode switching according to each instruction, and send an arithmetic operation result before the mode switching to the switched mode.

The second execution mode may include various types of software such as a network driver module and a TCP/IP module separately from the first execution mode in order to enhance security. Further, the second execution mode may be implemented by hardware independent of the first execution mode. For example, the first execution mode may be implemented by a different system-on-chip (SoC) or a different processor from the second execution mode. However, embodiments are not limited thereto, and it is a matter of course that one processor may be implemented in each of two regions divided logically and/or virtually.

The operation for the modes of the processor 120 has been described with reference to FIG. 2. Hereinafter, the operation of the processor 120 for enhancing the security of the artificial intelligence model will be described with a more specific example. Before the description, data stored in the secure area 111 and the non-secure area 112 will be described with reference to FIG. 3. Further, the first execution mode and the second execution mode will be described as the normal world and the secure world, respectively.

Figure 3:
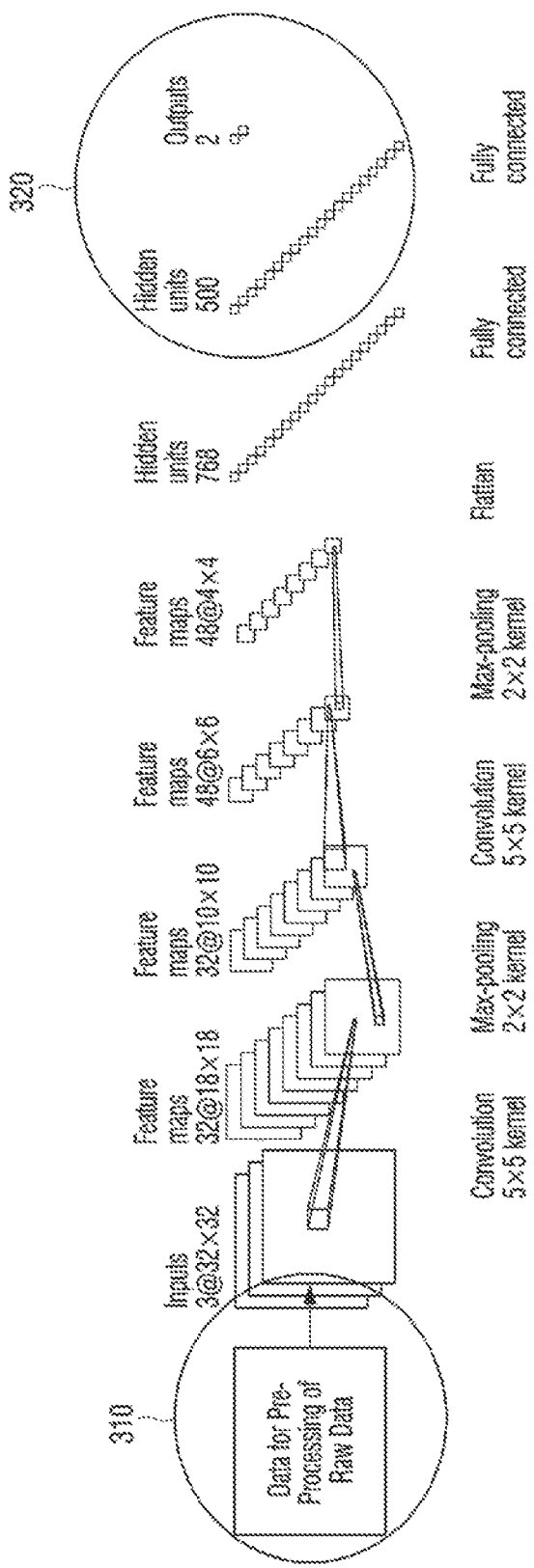
FIG. 3 is a diagram for describing data stored in a secure area and a non-secure area according to an embodiment.

FIG. 3 is a diagram for describing data stored in the secure area 111 and the non-secure area 112 according to an embodiment. In FIG. 3, the plurality of neural network layers included in the artificial intelligence model are omitted for convenience of explanation, and data processed by each layer is illustrated. That is, an arithmetic operation on the input data is performed through the plurality of neural network layers included in the artificial intelligence model, and FIG. 3 illustrates an output of each of the plurality of neural network layers.

First, pre-processed raw data may be input to the artificial intelligence model. In some embodiments, data 310 for pre-processing the raw data of FIG. 3 may be stored as the first data in the secure area 111. For example, in some embodiments, the data 310 for pre-processing the raw data may include raw data processing and feature extraction.

In some embodiments, the first data may include at least one of data used for filtering of raw data to be input to the artificial intelligence model among a plurality of raw data, or data used for conversion of raw data into input data to be input to the artificial intelligence model. For example, the processor 120 may filter only an image having a resolution equal to or higher than a predetermined resolution among a plurality of image data, convert the filtered image into data representing a frequency component, and input the converted data to the artificial intelligence model.

However, this is only an example, and in some embodiments various pre-processing methods may be used. For example, the processor 120 may pre-process the raw data by changing the resolution of the image or removing noise from an audio, and the pre-processing method may vary depending on the artificial intelligence model.

In some embodiments, the second data used in some of the plurality of neural network layers included in the artificial intelligence model may also be stored in the secure area 111. For example, information 320 regarding the parameter used in the last layer of the plurality of neural network layers of FIG. 3 may be stored in the secure area 111. In some embodiments, the last layer of the plurality of neural network layers may be a fully connected layer.

In general, the size of the output of each of the plurality of neural network layers may decrease as the arithmetic operation proceeds, and accordingly, the size of the neural network layer may also decrease. The capacity of the secure area 111 may also be limited, and thus, it may be more efficient to store a neural network layer with a small data size among the plurality of neural network layers rather than storing all the plurality of neural network layers.

That is, the second data stored in the secure area 111 may include a parameter used in at least one layer determined based on the size of parameter information used in each of the plurality of layers.

However, this is only an example, and in some embodiments any number of other neural network layers may be stored as long as the capacity of the secure area 111 allows. For example, the second data to be stored in the secure area 111 may include information regarding parameters used in the middle layer of the plurality of neural network layers and information 320 regarding the parameters used in the last layer of the plurality of neural network layers.

Data other than the second data among the plurality of neural network layers may be stored as the third data in the non-secure area 112. The third data may include a plurality of neural network layers of various types such as a convolution layer and a fully connected layer, but does not include the last layer. That is, in some embodiments, the third data may include information regarding parameters used in any other layer of the plurality of neural network layers except for the layer(s) for which parameters are stored in the secure area 111.

It has been described in FIG. 3 that the data 310 for pre-processing the raw data and the information 320 regarding the parameters used in the last layer of the plurality of neural network layers are stored in the secure area 111, but embodiments are not limited thereto.

For example, in some embodiments, only the data 310 for pre-processing the raw data may be stored in the secure area 111, or in other embodiments only the information 320 regarding the parameters used in the last layer of the plurality of neural network layers may be stored in the secure area 111.

Figure 4:
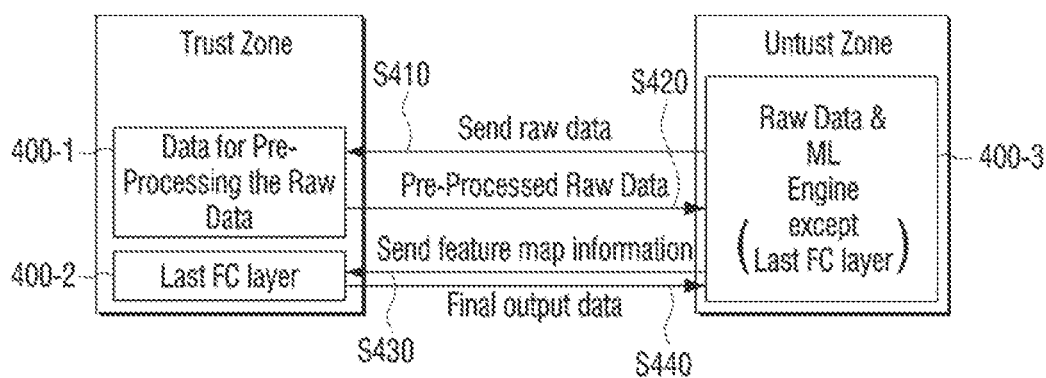
FIG. 4 is a diagram for describing an arithmetic operation process of an artificial intelligence model according to an embodiment.

FIG. 4 is a diagram for describing an arithmetic operation process of the artificial intelligence model according to an embodiment. In FIG. 4, for convenience of explanation, it is assumed that the data 310 for pre-processing the raw data of FIG. 3 and the information 320 regarding the parameters used in the last layer (last fully connected (FC) layer) of the plurality of neural network layers are stored as first data 400-1 and second data 400-2, respectively, in the secure area 111, and information regarding the parameters used in layers of the plurality of neural network layers except for the last layer of the plurality of neural network layers is stored as third data (ML engine (except for the last FC layer)) 400-3 in the non-secure area 112.

The processor 120 may operate as the normal world according to the execution of the module executing the artificial intelligence model, read the raw data stored in the non-secure area (untrusted zone) 112, perform mode switching, and send the read raw data to the secure world (S410).

In some embodiments, once the raw data is read, the module executing the artificial intelligence model may include an instruction to send the read raw data to the secure world.

The processor 120 may operate as the secure world, pre-process the raw data based on the first data 400-1, perform mode switching, and send the pre-processed data to the normal world (S420). For example, in some embodiments, the pre-processing operation may be an operation such as data processing or feature extraction, and the processed data or the extracted features may be sent to the normal world. The data processing may be an operation of filtering raw data to be input to the artificial intelligence model among a plurality of raw data, and the feature extraction may be an operation of converting raw data into input data to be input to the artificial intelligence model. Further, once the raw data is pre-processed, the module executing the artificial intelligence model may include an instruction to send the pre-processed raw data to the normal world.

The processor 120 may operate as the normal world, perform an arithmetic operation on the pre-processed data based on the third data 400-3, perform mode switching, and convert the feature map information output from the previous layer of the last layer, and send the feature map information to the secure world (S430). In some embodiments, once the arithmetic operation based on the third data 400-3 is completed, the module executing the artificial intelligence model may include an instruction to send the feature map information, which is a result of the arithmetic operation, to the secure world.

The processor 120 may operate as the secure world, perform an arithmetic operation on the feature map information based on the second data 400-2, and obtain, as the output data, data output from the last layer. The processor 120 may perform mode switching and provide the final output data (i.e., the final ML results) to a normal area (S440).

In the above, each mode switching operation may be an operation based on a mode switching instruction included in the module executing the artificial intelligence model.

However, embodiments are not limited thereto, and data regarding a mode switching time may be further stored in the secure area 111 and the non-secure area 112. For example, an instruction to perform mode switching once the pre-processing of the raw data is completed may be stored in the secure area 111. Further, an instruction to perform mode switching instruction based on the arithmetic operation on the feature map information based on the second data 400-2 being completed may be stored in the secure area 111. In some embodiments, a mode switching instruction may be stored in the non-secure area 112. In some embodiments, an instruction to provide arithmetic operation data obtained before mode switching to another mode based on the mode switching being performed may be further stored in the secure area 111 and the non-secure area 112.

It has been described above that the first data 400-1 used for the pre-processing of the raw data and the second data 400-2 used in the last layer of the plurality of neural network layers are stored in the secure area 111, and the third data 400-3 used in layers except for the last layer of the neural network layers is stored in the non-secure area 112. However, any number of other data may be stored in the secure area 111, and in this case, the arithmetic operation process of the processor 120 may also vary. That is, the processor 120 may perform an arithmetic operation based on data stored in the secure area.

Figure 5:
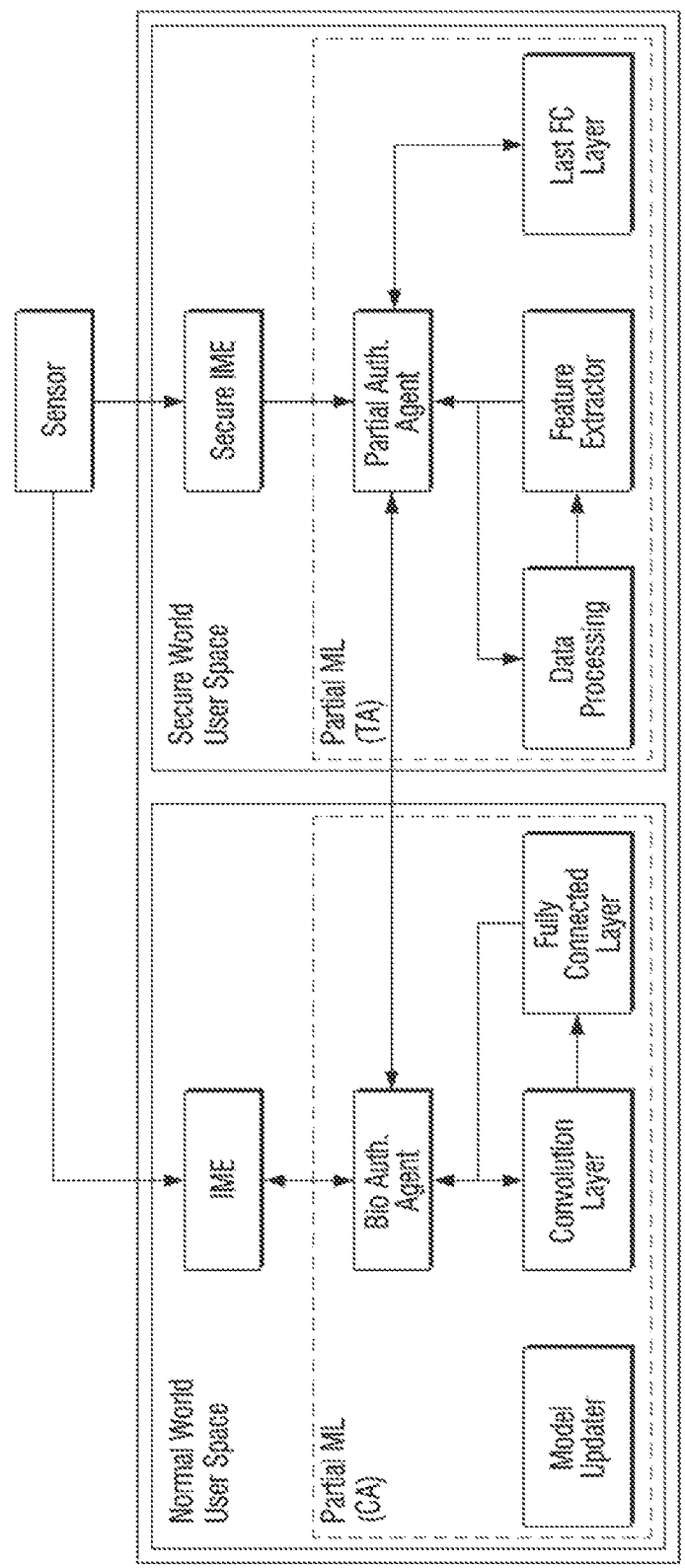
FIG. 5 is a diagram for describing an example of biometric authentication according to an embodiment of the disclosure.

FIG. 5 is a diagram for describing an example of biometric authentication according to an embodiment. In some embodiments, the biometric authentication means authentication using biometric information of a user such as fingerprint information, iris information, and/or voice information, and the biometric authentication of FIG. 5 may be performed through the artificial intelligence model. It is assumed that data for pre-processing biometric information and information regarding parameters used in the last layer of the plurality of neural network layers of the artificial intelligence model for the biometric authentication are stored as the first data and the second data, respectively, in the secure area 111, and information regarding parameters used in layers except for the last layer of the plurality of neural network layers is stored as the third data in the non-secure area 112. For convenience of explanation, the biometric authentication will be described below as being performed using a user face image as the biometric information.

The electronic device 100 may sense the biometric information through a sensor. For example, the electronic device 100 may include a camera and use a user face image captured through the camera as the biometric information. In the case in which the biometric information is fingerprint information, iris information and/or voice information, the electronic device 100 may include a different component as the sensor for sensing the biometric information. For example, a fingerprint reader, an iris scanner, or a microphone, etc.

In case of operating as the normal world, the processor 120 may receive information indicating that authentication is being attempted through an input method editor (IME). In this case, the biometric information is not provided to the processor 120, and security may be enhanced accordingly. Once information indicating that authentication is being attempted is received, the processor 120 may perform mode switching. For example, even in case that the user face image is obtained by the camera, in a state of operating as the normal world, the user face image is not provided to the processor 120, and only a notification that the user face image has been obtained may be provided.

In a state of operating as the secure world or in case of performing mode switching to the secure world according to the information indicating that authentication is being attempted, the processor 120 may receive the biometric information through a secure input method editor (IME). For example, in case that the user face image is obtained by the camera and the processor 120 is operating as the secure world, the user face image may be provided to the processor 120. In some embodiments, even in case that the user face image is obtained by the camera and the processor 120 is operating as the normal world, the user face image may be provided to the processor 120 once mode switching to the secure world is performed.

The processor 120 may perform pre-processing such as data processing and feature extraction on the biometric information through a partial authentication agent, perform mode switching, and send the pre-processed biometric information to the normal world. For example, in some embodiments, the partial authentication agent may send the pre-processed biometric information to a biometric authentication agent in the normal world. In some embodiments, the data processing and the feature extraction are information included in the first data.

For example, the processor 120 may perform pre-processing such as changing the size of the user face image to a preset size, and extracting a feature of a main part of the face from the user face image. Such a pre-processing operation may be based on the form of the input data of the artificial intelligence model.

The processor 120 may obtain the feature map information by processing the biometric information pre-processed through a bio authentication agent as the convolution layer and the fully connected layer included in the artificial intelligence model, perform mode switching, and provide the feature map information to the secure world. For example, in some embodiments, the biometric authentication agent may provide the feature map information to the partial authentication agent in the secure world. In some embodiments, the convolution layer and the fully connected layer included in the artificial intelligence model are information included in the third data.

The processor 120 may obtain the output data by processing the feature map information as the last FC layer through the partial authentication agent, perform mode switching, and provide the output data to the normal world. For example, in some embodiments, the partial authentication agent may send the output data to the biometric authentication agent in the normal world. For example, in some embodiments, the processor 120 may identify whether or not the user is a pre-registered user by applying the artificial intelligence model to the pre-processed user face image, and may provide the identification result to the normal world.

The processor 120 may provide the output data to the IME through the bio authentication agent. In some embodiments, the processor 120 may control a model updater to update parameters included in the artificial intelligence model based on the output data. In some embodiments, the updated parameters may be stored in the memory 110.

With the above-described process, the electronic device 100 may identify whether or not the biometric information is authenticated.

Figure 6:
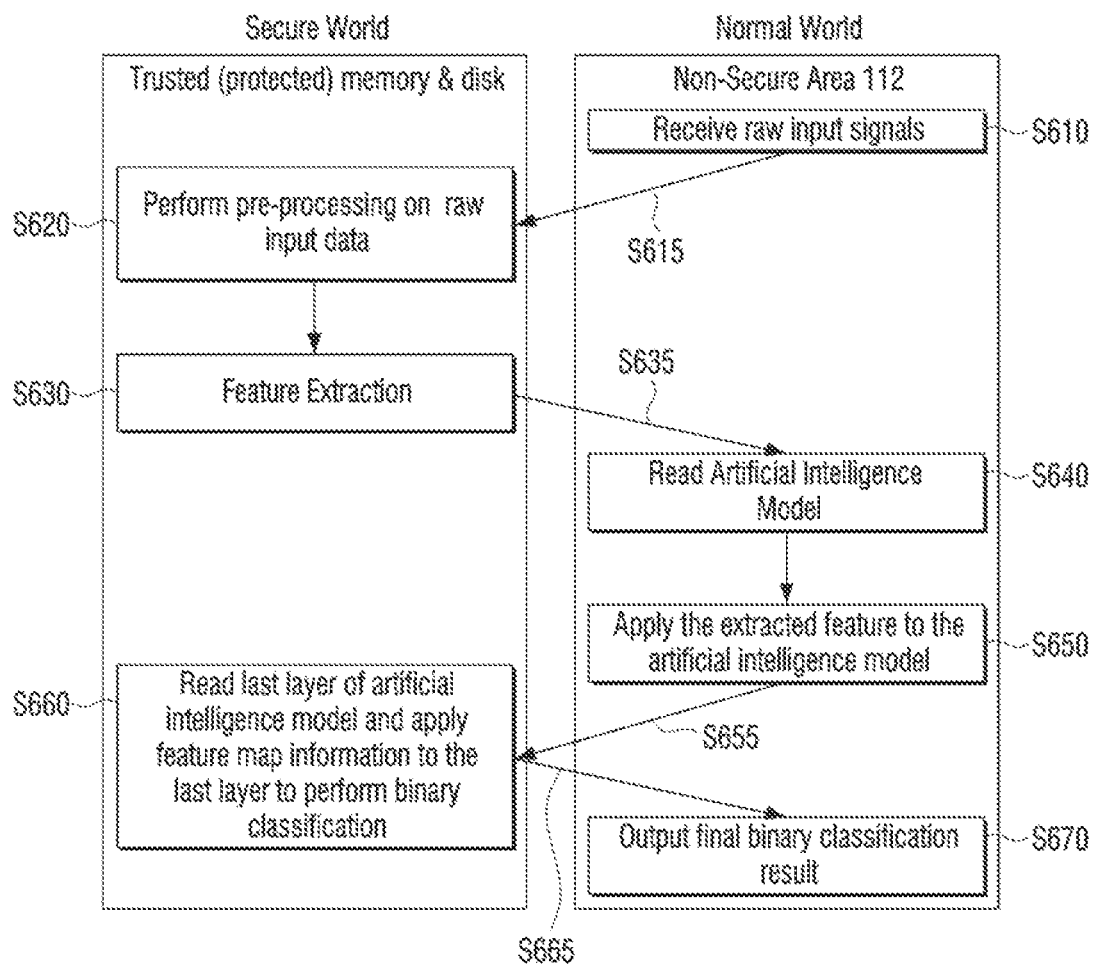
FIG. 6 is a diagram for describing an audio analysis method according to another embodiment.

FIG. 6 is a diagram for describing an audio analysis method according to an embodiment. The audio analysis method of FIG. 6 may be performed through the artificial intelligence model. It is assumed that data for pre-processing an audio signal such as a voice of the user and information regarding parameters used in the last layer of the plurality of neural network layers of the artificial intelligence model for audio analysis are stored as the first data and the second data, respectively, in the secure area 111, and information regarding parameters used in layers except for the last layer of the plurality of neural network layers is stored as the third data in the non-secure area 112.

The processor 120 may operate as the normal world and read the raw data such as the voice of the user stored in the non-secure area 112 (S610). For example, in some embodiments, the non-secure area 112 may be an untrusted memory and/or an untrusted disk.

Once the raw data is read, the processor 120 may perform mode switching to the secure world to pre-process the raw data, and send the raw data to the secure world (S615).

The processor 120 may operate as the secure world and pre-process the raw data based on data stored in the secure area 111 (S620). For example, in some embodiments, the secure area 111 may be a trusted (e.g., protected) memory and/or a trusted (protected) disk. In some embodiments, the processor 120 may perform pre-processing such as removing a sound having a threshold amplitude or less from the raw data and/or performing normalization.

The processor 120 may extract a feature from the pre-processed raw data (S630). For example, in some embodiments, the processor 120 may extract a frequency feature such as a constant-Q transform (CQT) and/or a short-time Fourier transform (STFT) from the raw data.

Once the feature is extracted from the raw data, the processor 120 may perform mode switching to the normal world and send the extracted feature to the normal world (S635).

The processor 120 may operate as the normal world and read the artificial intelligence model stored in the non-secure area 112 (S640). For example, in some embodiments, the processor 120 may operate as the normal world and read a voice liveness detection (Void) lookup-based convolutional neural network (LCNN) model stored in the non-secure area 112. However, in some embodiments, the artificial intelligence model may be an artificial intelligence model that does not include the last layer.

The processor 120 may apply the extracted feature to the artificial intelligence model while operating as the normal world (S650). The feature map information may be output as the application result, because the last layer is not included in the artificial intelligence model.

Once the feature map information is output while operating as the normal world, the processor 120 may perform mode switching to the secure world and send the feature map information to the secure world (S655).

The processor 120 may operate as the secure world, read the last layer of the artificial intelligence model from the secure area 111, and apply the feature map information to the last layer to perform binary classification (S660). Although FIG. 6 illustrates that the artificial intelligence model performs the binary classification, any other artificial intelligence model may be used.

Once the binary classification result is obtained while operating as the secure world, the processor 120 may perform mode switching to the normal mode and send the binary classification result to the normal mode (S665).

The processor 120 may operate as the normal world and output the final binary classification result (S670). For example, in some embodiments, the processor 120 may operate as the normal world and provide the binary classification result to the user and/or perform an operation based on the binary classification result.

As described above, some of the data for applying the artificial intelligence model are stored in the secure area 111, thereby making it possible to enhance the security of the artificial intelligence model.

Figure 7:
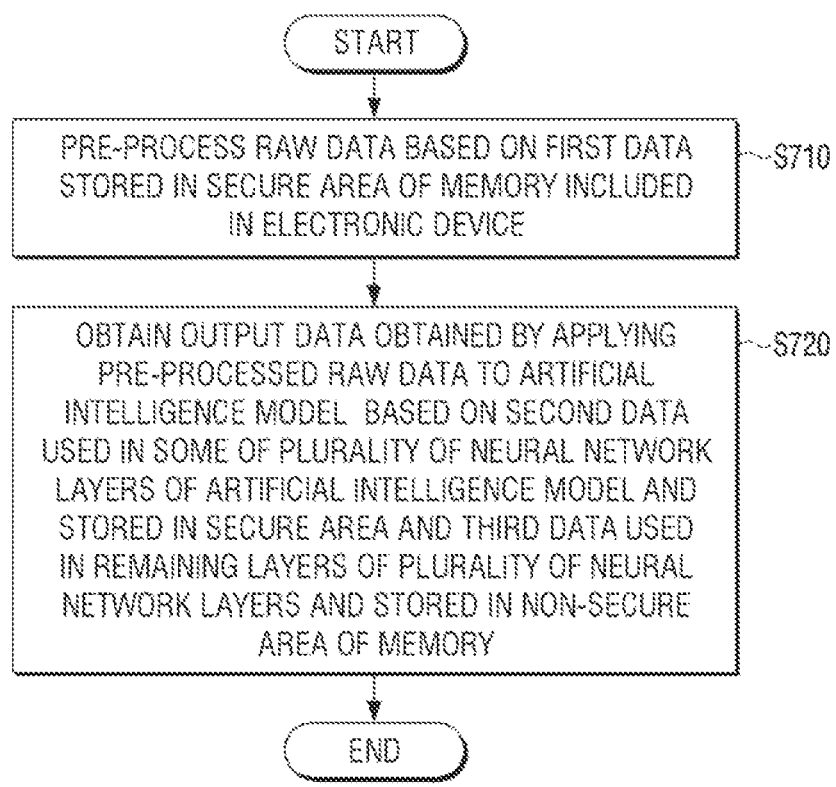
FIG. 7 is a flowchart for describing a control method of the electronic device according to an embodiment.

FIG. 7 is a flowchart for describing a control method of the electronic device according to an embodiment.

The raw data is pre-processed based on the first data stored in the secure area of the memory included in the electronic device (S710).

The output data obtained by applying the pre-processed raw data to the artificial intelligence model is obtained based on the second data used in some of the plurality of neural network layers of the artificial intelligence model and stored in the secure area, and the third data used in the remaining layers of the plurality of neural network layers and stored in the non-secure area of the memory (S720).

In some embodiments, the first data may include at least one of data used for filtering of raw data to be input to the artificial intelligence model among a plurality of raw data, or data used for conversion of raw data into input data to be input to the artificial intelligence model.

In some embodiments, the second data may include the information regarding the parameters used in the last layer of the plurality of neural network layers.

In the pre-processing (S710), the electronic device may operate as the secure world, read the raw data stored in the non-secure area into the secure area, and pre-process the raw data based on the first data.

In some embodiments, the third data may include the information regarding the parameters used in layers except for the last layer of the plurality of neural network layers, and in the obtaining (S720), the electronic device may operate as the normal world, perform an arithmetic operation on the pre-processed data based on the third data, and obtain the feature map information output from a previous layer of the last layer.

In some embodiments, in the obtaining (S720), the electronic device may operate as the normal world, perform an arithmetic operation on the feature map information based on the second data, and obtain, as the output data, data output from the last layer.

For example, in some embodiments, the second data may include the parameter used in at least one layer determined based on the size of parameter information used in each of the plurality of layers.

In some embodiments, the memory may include the first memory used as the secure area and the second memory used as the non-secure area.

In some embodiments, the control method may further include obtaining at least one raw data through the sensor included in the electronic device, and in the pre-processing (S710), the obtained raw data may be filtered based on the first data, and the filtered raw data may be converted into the input data to be input to the artificial intelligence model.

According to various embodiments as described above, the electronic device may prevent the artificial intelligence model from being leaked by storing some data necessary for the operation of the artificial intelligence model in the secure area. In addition, it is possible to prevent the artificial intelligence model from being leaked by using the method according to the various embodiments in case that the capacity of the secure area is small, because only some data are stored in the secure area.

According to an embodiment, the various embodiments described above may be implemented by software including instructions stored in a machine-readable storage medium (for example, a computer-readable storage medium). The machine is a device that may invoke a stored instruction from a storage medium and may be operated according to the invoked instruction. The machine may include the electronic device (for example, the electronic device A) according to the embodiments. In case that an instruction is executed by the processor, the processor may directly perform a function corresponding to the instruction or other components may perform the function corresponding to the instruction under a control of the processor. The instruction may include codes created by a compiler or codes executed by an interpreter. The machine-readable storage medium may be provided in a form of a non-transitory storage medium. The term "non-transitory" means that the storage medium is tangible without including a signal, and does not distinguish whether data is semi-permanently or temporarily stored on the storage medium.

According to an embodiment, the methods according to the various embodiments described above may be included and provided in a computer program product. The computer program product may be traded as a product between a seller and a purchaser. The computer program product may be distributed in a form of a storage medium (for example, a compact disc read only memory (CD-ROM)) that may be read by the machine or may be read online through an application store (for example, PlayStore™). In case of online distribution through the application store, at least a part of the computer program product may be at least temporarily stored in a storage medium such as a memory of a server of a manufacturer, a server of an application store, or a relay server, or may be temporarily created.

According to an embodiment, the various embodiments described above may be implemented in a computer or a computer-readable recording medium using software, hardware, or a combination of software and hardware. In some cases, embodiments described herein may be implemented by the processor itself. When implemented as software, the embodiments such as procedures and functions described in the specification may be implemented by separate software modules. Each of the software modules may perform one or more functions and operations described above.

In some embodiments, computer instructions for performing processing operations of the machines according to the various embodiments described above may be stored in a non-transitory computer-readable medium. The computer instructions stored in the non-transitory computer-readable medium allow a specific machine to perform the processing operations in the machine according to the various embodiments described above when they are executed by a processor of the specific machine. The non-transitory computer-readable medium is not a medium that stores data therein for a while, such as a register, a cache, a memory, or the like, but non-transitory computer-readable medium means a medium that semi-permanently stores data therein and is readable by the machine. A specific example of the non-transitory computer-readable medium may include a compact disk (CD), a digital versatile disk (DVD), a hard disk, a Blu-ray disk, a universal serial bus (USB), a memory card, a ROM, or the like.

In some embodiments, each of components (for example, modules or programs) according to the various embodiments described above may include a single entity or a plurality of entities, and some of the corresponding sub-components described above may be omitted or other sub-components may be further included in the various embodiments. Alternatively or additionally, some of the components (for example, the modules or the programs) may be integrated into one entity, and may perform functions performed by the respective corresponding components before being integrated in the same or similar manner. Operations performed by the modules, the programs, or other components according to the various embodiments may be performed in a sequential manner, a parallel manner, an iterative manner, or a heuristic manner, at least some of the operations may be performed in a different order or be omitted, or other operations may be added.

Although various embodiments have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure and accompanying claims.

What is claimed is:

1. An electronic device comprising:
   a memory configured to store information related to an artificial intelligence model that performs arithmetic operations through a plurality of neural network layers; and
   a processor configured to pre-process raw data using first data and obtain output data by inputting the preprocessed raw data to the artificial intelligence model in which second data is used in a portion of the plurality of neural network layers of the artificial intelligence model and third data is used in remaining layers of the plurality of neural network layers other than the portion of the plurality of neural network layers, wherein the first data used for pre-processing the raw data and the second data used in the portion of the plurality of neural network layers are stored in a secure area of the memory, and the third data used in the remaining layers of the plurality of neural network layers other than the portion of the plurality of neural network layers is stored in a non-secure area of the memory, wherein the remaining layers comprise a last layer of the plurality of neural network layers and the second data includes information regarding parameters used in the last layer, wherein the first data includes at least one of data used for filtering of raw data to be input to the artificial intelligence model among a plurality of raw data, or data used for conversion of raw data into input data to be input to the artificial intelligence model, and wherein the processor operates as a secure world, reads the raw data stored in the non-secure area, and pre-processes the raw data based on the first data, and operates as a normal world, performs an arithmetic operation on the pre-processed data based on the third data, and obtains feature map information output from a previous layer of the last layer.

2. The electronic device as claimed in claim 1, wherein the processor operates as the secure world, performs an arithmetic operation on the feature map information based on the second data, and obtains, as the output data, data output from the last layer.

3. The electronic device as claimed in claim 1, wherein the remaining layers comprise at least one layer that is determined based on a size of parameter information used in each of the plurality of neural network layers, and the second data includes a parameter used in the at least one layer.

4. The electronic device as claimed in claim 1, wherein the memory includes:
a first memory used as the secure area; and
a second memory used as the non-secure area.

5. The electronic device as claimed in claim 1, further comprising a sensor,
wherein based on at least one raw data being obtained through the sensor, the processor filters the obtained raw data based on the first data and converts the filtered raw data into input data to be input to the artificial intelligence model.

6. A control method of an electronic device, the control method comprising:
pre-processing raw data based on first data stored in a secure area of a memory included in the electronic device; and
obtaining output data by applying the pre-processed raw data to an artificial intelligence model based on second data used in a portion of a plurality of neural network layers of the artificial intelligence model and stored in the secure area, and third data used in remaining layers of the plurality of neural network layers other than the portion of the plurality of neural network layers and stored in a non-secure area of the memory,
wherein the remaining layers comprise a last layer of the plurality of neural network layers and the second data includes information regarding parameters used in the last layer,
wherein the first data includes at least one of data used for filtering of raw data to be input to the artificial intelligence model among a plurality of raw data, or data used for conversion of raw data into input data to be input to the artificial intelligence model,
wherein in the pre-processing, the electronic device operates as a secure world, reads the raw data stored in the non-secure area, and pre-processes the raw data based on the first data, and
in the obtaining, the electronic device operates as a normal world, performs an arithmetic operation on the preprocessed data based on the third data, and obtains feature map information output from a previous layer of the last layer.

7. The control method as claimed in claim 6, wherein in the obtaining, the electronic device operates as the normal world, performs an arithmetic operation on the feature map information based on the second data, and obtains, as the output data, data output from the last layer.

* * * * *